Figure 1A:
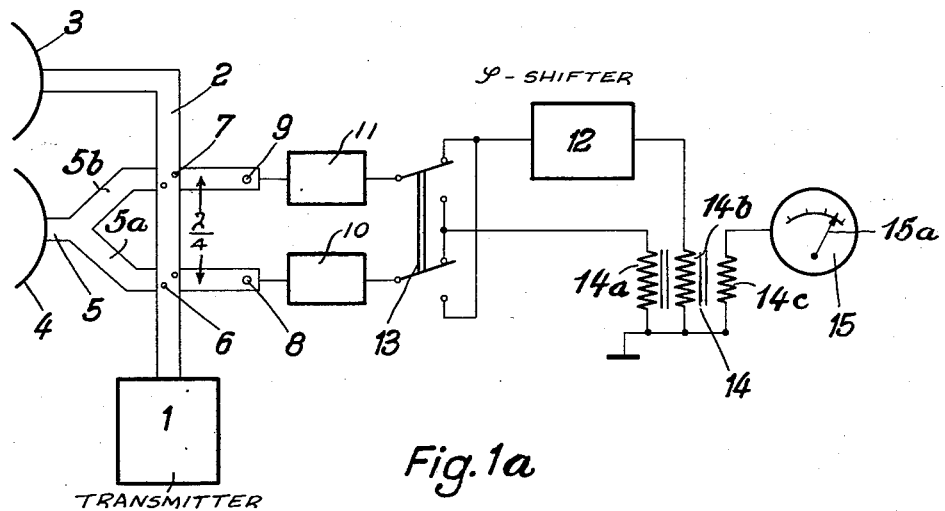

INVENTORS:
HEINZ LUEG
WOLF SCHALLEHN
HANS-HERMANN TOEDTER

BY *Eric D. Frankel*

PATENT AGENT

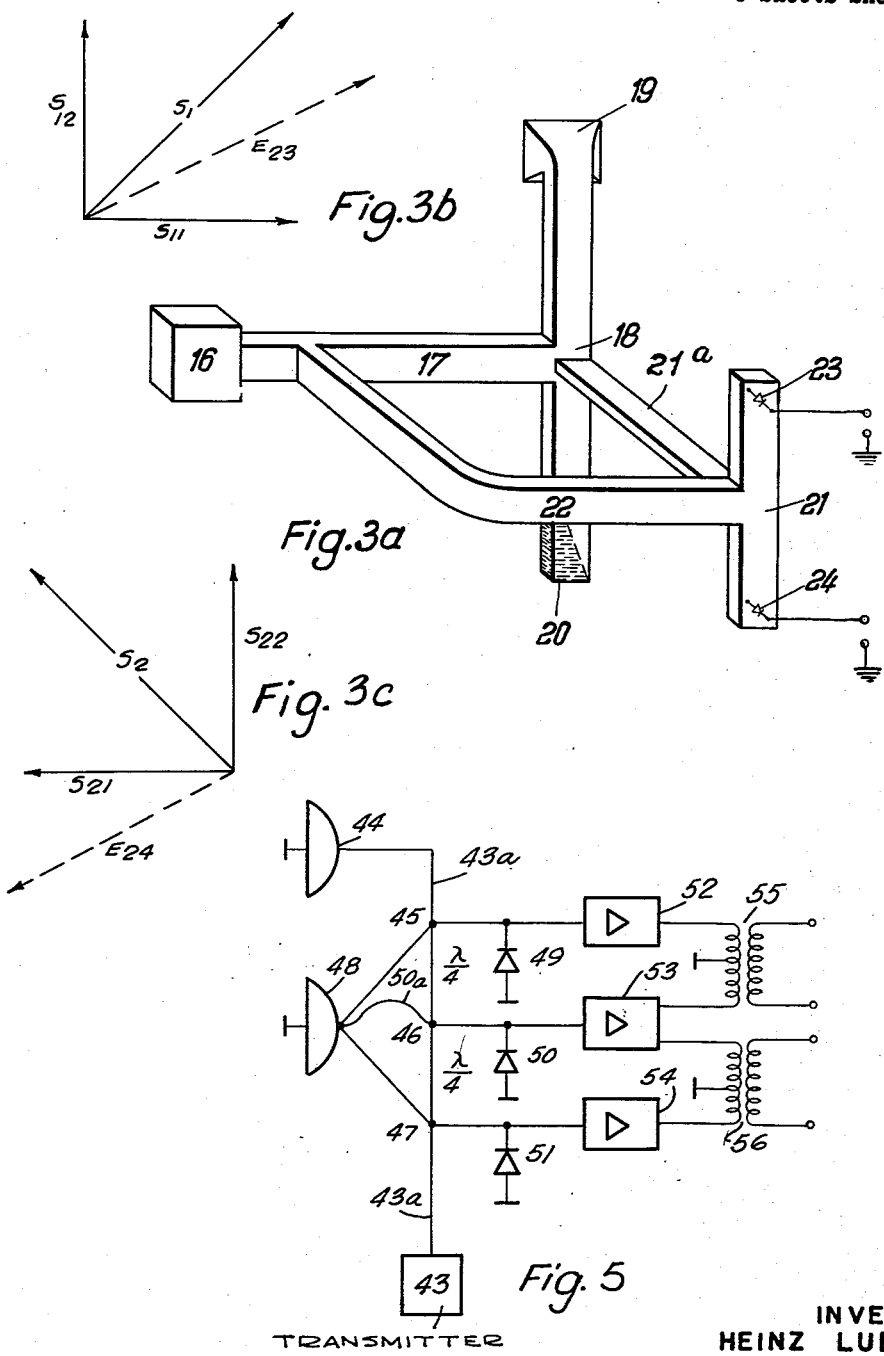

Oct. 3, 1961   H. LUEG ET AL   3,003,147
SPEED MEASURING SYSTEM
Filed Dec. 13, 1957   5 Sheets-Sheet 5

INVENTORS:
HEINZ LUEG
WOLF SCHALLEHN
HANS-HERMANN TOEDTER

BY  Eric D. Frankel
    PATENT AGENT

United States Patent Office

3,003,147
Patented Oct. 3, 1961

3,003,147
SPEED MEASURING SYSTEM
Heinz Lueg, Wolf Schallehn, and Hans-Hermann Toedter, Ulm (Danube), Germany, assignors to Telefunken G.m.b.H., Berlin, Germany
Filed Dec. 13, 1957, Ser. No. 702,728
Claims priority, application Germany Dec. 22, 1956
20 Claims. (Cl. 343—8)

The present invention relates to a device for speed measurement by means of the Doppler effect and by using the radar reflection principle, particularly, by employing very short electromagnetic waves. This device is adapted to distinguish between approaching and receding targets in such a manner, that velocities of either the approaching or the receding targets are indicated. Devices for measuring speeds are used, e.g., by the police, to check the speeds of vehicles on the road.

It has been known in the art to ascertain the radial velocity of a moving object by means of a radar reflection apparatus in measuring the Doppler frequency, for example, by mixing the oscillation received with a reference oscillation, particularly with the transmitted oscillation. The Doppler frequency is proportional to the radial velocity of the target; consequently, this Doppler frequency may be the direct input of a frequency-sensitive indicator having its scale calibrated in units of velocity. However, the Doppler frequency is independent of the direction of movement of the target. Therefore, it is not apparent from the Doppler frequency per se whether the target is approaching or receding. From a theoretical standpoint, it is possible to ascertain the direction of movement by observing the magnitude of the frequency or the magnitude of the amplitude of this oscillation. However, in practice, these two methods fail to operate. It is impossible to distinguish the reflected signal from the transmission signal clearly enough so that the frequency of the reflected oscillation itself may be measured. The amplitude of the reflected signal depends strongly upon the indeterminate variable introduced by the index of reflection of the object, hence, this amplitude is not directly related to the direction of movement of the object. However, it might be possible that the amplitude of the reflected signal decreases while the object is approaching.

A radar reflection device for speed measurement has been proposed to ascertain the direction of movement in addition to the velocity of the target, see article "Direction Sensitive Doppler Device," by H. P. Kalmus in Proc. I.R.E. of June 1955, pages 698 to 700.

According to this device, two Doppler oscillations are produced by mixing the transmitted oscillation and the received oscillation. The first Doppler oscillation is produced simply by superposing the transmission oscillation and the received oscillation. The second Doppler oscillation is produced by phase shifting of one of the oscillations +90° or —90°. In any event, the difference in phase of the two mixed oscillations amounts to 90°. Thus, two Doppler oscillations are obtained having equal amplitudes but always being mutually displaced in phase by 90°. The sign of the phase difference between the two Doppler oscillations depends upon the direction of movement of the target object. These two oscillations are supplied to the field coils of a two phase synchronous motor for producing a rotating field and the direction of this rotation depends upon the phase relationship of the two Doppler oscillations, said relationship depending upon the direction of movement of the reflecting object. The armature of the motor follows the rotating field, thus, the rotation of the motor depends upon the direction of motion of the object, while the motor speed is related to the speed of the object.

It is an object of the present invention to provide a device for speed measurement indicating the velocity of either approaching or receding objects. Accordingly, the basic device of the present invention utilizes the above-mentioned system adapted for the indication of both the velocity and the direction of movement of the object; but the known device cannot suppress either the indication of approaching or receding objects. This last-mentioned suppression may be of interest to police for measuring the speed of vehicles traveling only in one direction, while vehicles traveling in the opposite direction are excluded from the measurement in order to avoid confusion.

It is another object of the invention to provide a device employing the radar reflection principle for measuring velocities having in its receiver means for the production of two Doppler oscillations, by mixing the oscillations received with a reference oscillation of constant frequency, which reference oscillation may be the transmitted oscillation. The above-mentioned mixing may be performed by providing a phase difference between the received oscillation and the reference oscillation of 90°; furthermore, by providing means for the selective introduction of an additional phase shift of ±90° between the two Doppler oscillations. In addition, means are provided for superimposing the two Doppler oscillations after said additional phase shift and, furthermore, frequency-sensitive indicating means are provided for determining the velocity by superimposing the Doppler oscillations.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figures 2A, 2B:
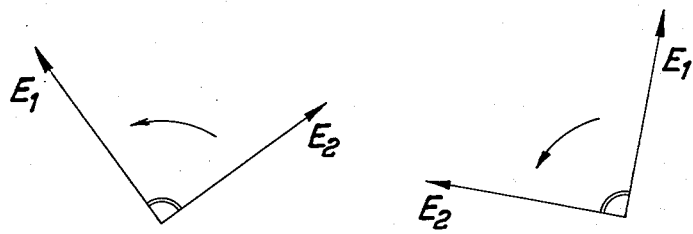
Figure 1B:
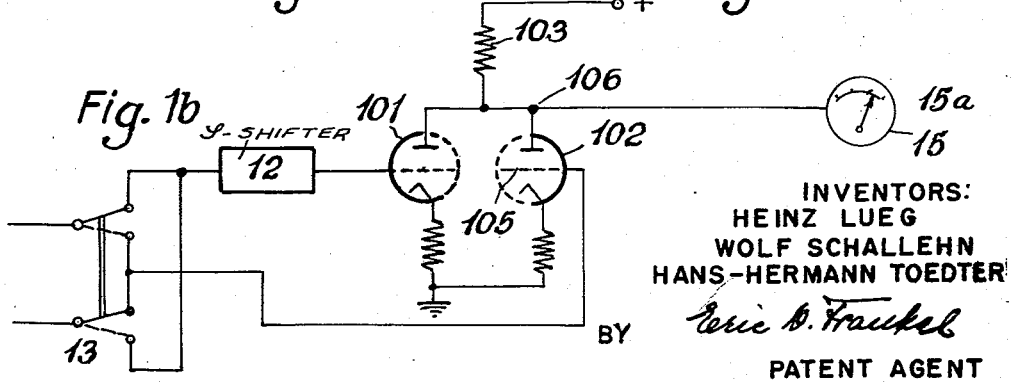
Figure 4:
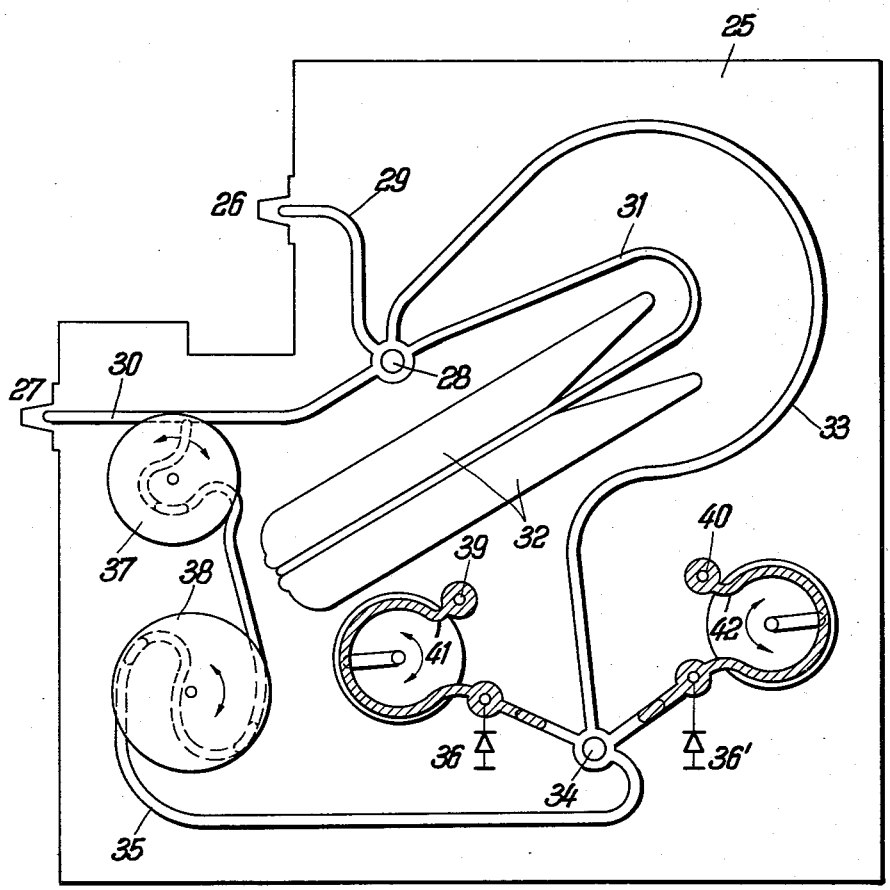
Figure 6:
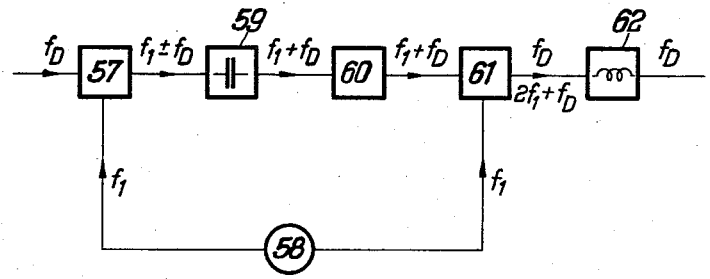
Figure 7:
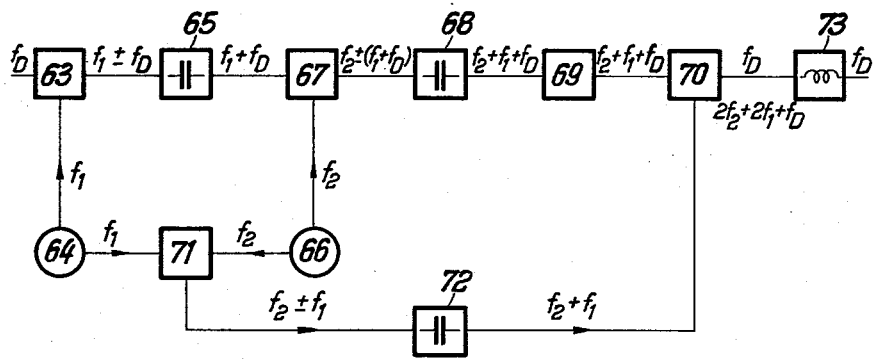
Figure 8:
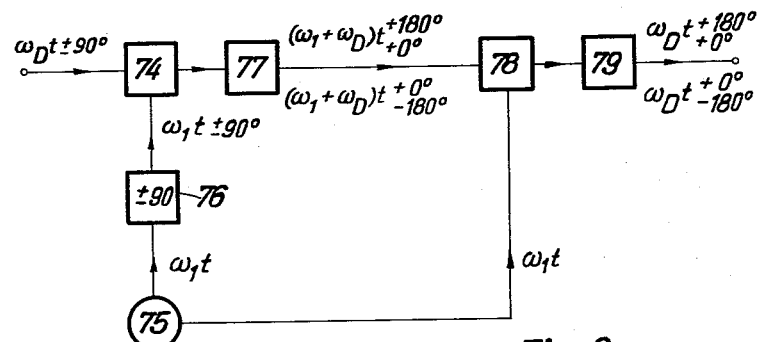
Figure 9:
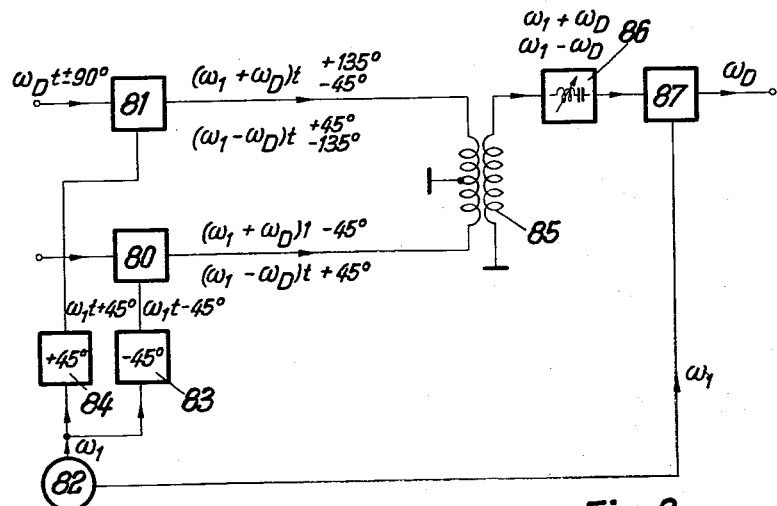

In the drawings:
FIGURE 1a shows diagrammatically a system according to the invention;
FIGURE 1b shows diagrammatically a modified system according to the invention;
FIGURES 2a and 2b show vector-diagrams of the voltages appearing at input and output, respectively, of amplifiers shown in FIGURE 1a;
FIGURE 3a illustrates another device according to the invention in perspective, using wave guides;
FIGURES 3b and 3c illustrate vector diagrams of voltages appearing within the device as shown in FIGURE 3a;
FIGURE 4 shows schematically another embodiment of the invention using metallized tape conductors;
FIGURE 5 illustrates in a block diagram a mixing device for excluding harmonics of the Doppler frequencies;
FIGURE 6 illustrates diagrammatically a phase shifter device utilizing conversion to higher frequencies and adapted to be used in devices according to the invention;
FIGURE 7 shows diagrammatically a two-stage phase shifting device according to the invention utilizing conversion to higher frequencies;
FIGURE 8 diagrammatically shows another phase shifting device for use in systems according to the invention;
FIGURE 9 is a diagram showing a further modified phase shifting device for use in a system according to the invention.

In FIGURE 1a, numeral 1 denotes a transmitter known per se generating continuous oscillations. The output of the transmitter is conducted via high frequency line 2 to a transmitting antenna 3, shown only schematically. 4 indicates a receiving antenna facing in the same direction as antenna 3. The receiving antenna 4 feeds another high-frequency line 5 having two branches 5a and 5b. In the embodiment of the present invention, the lines 2 and 5 are hollow guides; however, other high-frequency lines may be used, such as coaxial cables. The two branches 5a and 5b of the hollow guide 5 are connected to the hollow guide 2 by means of two directional couplers 6 and 7, respectively.

The guide 2 is coupled to the branches 5a and 5b of the guide 5 to superimpose small portions of the transmitted oscillations on the oscillations received. The distance between the directional coupler 6 and the directional coupler 7 is equal to a quarter-wave-length of the transmitted oscillation. The received oscillations appearing in the two branches have equal phase and travel through guide 5 to the directional couplers, but the transmitted oscillations are out of phase by 90° at the two coupling points 6 and 7. The two branches 5a and 5b of the guide 5 are terminated by two similar mixing detectors 8 and 9, respectively, each of which detector serves to extract a Doppler frequency out of the superimposed transmitted oscillations and received oscillations. These two Doppler oscillations have equal amplitudes, but they have a phase difference of 90°, because of the difference in phase between the two transmitted oscillations used for superposition at the points 6 and 7. Separate amplifiers 10 and 11 are provided for the amplification of the two Doppler oscillations. The two amplifiers have excellent phase and amplitude fidelity. The pass-band of the two amplifiers is selected in such a manner that only the Doppler frequency, i.e., the difference of transmitted frequency and received frequency is amplified, while the sum of these two frequencies is not amplified.

According to the invention, another phase difference of +90° or −90° between the two Doppler oscillations is produced by shifting one of the Doppler oscillations 90° and superimposing it on the other Doppler oscillation. The superposition of the two Doppler oscillations causes a single resultant Doppler oscillation which represents only approaching or receding motion. In the example shown in FIGURE 1a, a phase shifter 12 is provided for the above-mentioned purpose, said phase shifter 12 varying the phase of its input by 90°. The phase shifter 12 may be connected to each one of the amplifiers selectively by means of the switch 13. The output voltages of the two amplifiers 10 and 11 are supplied to a transformer 14 after one of these outputs has been shifted in phase by the shifter 12. The transformer 14 has two input coils 14a and 14b. The voltages of the two amplified Doppler oscillations are supplied across these input coils 14a and 14b and the Doppler oscillation used for the indication appears across the output coil 14c of the transformer 14. The velocity is indicated by an instrument 15, known per se in the art, the deflection of the pointer 15a of said instrument 15 is proportional to the input frequency.

The phase vector diagrams of the Doppler oscillations at the outputs of the two amplifiers 10 and 11 are shown in FIGURES 2a and 2b for a better understanding of the invention. It is assumed that the voltage $E_1$ appears across the output terminals of the amplifier 10 and the voltage $E_2$ appears at the output terminals of the amplifier 11. In FIGURE 2a, it is assumed that the object approaches the measuring device and the vector $E_1$ leads by 90° the vector $E_2$. Conversely, according to FIGURE 2b, the vector $E_1$ lags the vector $E_2$ by 90° if the object recedes. If, for example, only approaching objects are to be indicated and if, furthermore, the phase shifting device 12 operates as a delay, the position of the switch 13 has to be selected so that the phase of the output of the amplifier 10, i.e. vector $E_1$, is delayed by 90°. $E_1$ and $E_2$ are then superimposed in the transformer 14 with identical phase. Consequently, if a signal is received from a receding object while the switch 13 is in the last-mentioned position, vector $E_1$ lags vector $E_2$ according to FIGURE 2b. However, the shifting device 12 also delays vector $E_1$ by 90° and, thus, $E_1$ and $E_2$ are superimposed in the transformer 14 with opposite phase; hence, receding objects are not indicated when the switch 13 has the position described, because no output can be derived from the transformer 14. On the other hand, if the switch 13 has the position shown in the drawing, the vector $E_2$ is delayed by 90°, causing in the transformer 14 a superposition in phase of signals from receding objects, however causing a cancellation of signals from approaching objects, so that the indications of the last-mentioned objects, i.e., the indications of the signals from approaching objects, are suppressed. Of course, the phase shifter 12 may provide a clockwise phase shift rather than a counter-clockwise shift. In this case, the switch 13 would cause the opposite effects to those described above.

An attenuation effected by the phase shifter 12 may be compensated by an additional amplifier or by an additional attenuation in the transmission line of the signal which does not pass through the phase shifter 12.

The required phase shift between the two voltages $E_1$ and $E_2$ may be achieved without the switch 13 by connecting a phase shifter to one of the amplifiers 10 or 11, which phase shifter is adjustable to provide a shift of either +90° or −90°.

The transformer 14, shown in FIGURE 1a, may be replaced by other kinds of superimposing circuits, as shown in FIGURE 1b. For example, the two Doppler oscillations may be supplied to the grids 104 and 105, respectively, of two electronic amplifiers 101 and 102 having a common load resistor 103 and a common output terminal 106. For this circuit, a dual triode, as shown in FIGURE 1b, would be very advantageous.

The embodiment of the invention, as described with reference to FIGURE 1a and FIGURE 1b, requires very short electromagnetic waves for transmission and reception. However, the invention is applicable also to other kinds of oscillation, such as acoustic waves. In addition, the invention may be used in simple reflecting devices measuring only velocities or in radar devices known per se for locating objects. The devices according to FIGURES 1a and 1b employ two antennas, one for transmitting and one for receiving.

In the following, improved embodiments of the invention are described, employing only one antenna, said antenna being used for both transmitting and receiving. FIGURES 3a and 4 illustrate circuits along this line.

In the example according to FIGURE 3a, there is used the wave guide technique. The transmitter is denoted by 16, its output is connected to the push-push input terminals of a high frequency bridge 18 via a wave guide 17. In the present example, the bridge 18 is a hybrid T. A transmitting-receiving antenna 19 and a terminating resistor 20 are connected to the two other inputs, respectively, said two inputs being coupled to the first-mentioned input of the bridge 18. The antenna 19 is illustrated as a horn and the resistor 20 may be a wedge of graphite. The fourth input of the high frequency bridge 18 is the push-pull input of the hybrid T which is connected to another high frequency bridge 21, said high frequency bridge 21 being also a hybrid T. The push-push input of the second hybrid T 21 is connected to the output of the transmitter 16 via a high frequency conductor 22. The other two inputs of the high frequency bridge 21 are terminated by two mixing detectors 23 and 24, respectively.

The operation of the device according to FIGURE 3a will be better understood with reference to FIGURES 3b and 3c. The received oscillation is transmitted from the antenna 19 via the high frequency bridge 18 to the push-pull input of the high frequency bridge 21. A second portion of the oscillation travels through a wave guide 17 to the transmitter 16. This last-mentioned oscillation is undesirable for the operation of the present device and this portion may be suppressed in the coupling of the wave guide 17 to the output of the transmitter.

The oscillation received energizes the high-frequency bridge 21 at its push-pull input through the guide 21a. Hence, portions of the oscillation received appear at the mixing detectors 23 and 24, respectively, said portions having opposite phase and similar amplitude. The vectors representing these last-mentioned oscillations are drawn in FIGURES 3b and 3c by dashed arrows and indicated by $E_{23}$ and $E_{24}$, respectively. $E_{23}$ is the voltage at the detector 23 and $E_{24}$ the voltage at the detector 24. In addition to the oscillations received by the antenna 19, two portions of the transmitted oscillation are supplied to the two mixing detectors 23 and 24, the one of said portions coming through the high frequency bridge 18, and the other of said portions coming through the guide 22. The antenna 19 or the resistor 20 may easily be mismatched, because that input of the high frequency bridge 18 which is connected to the guide 17 is decoupled from the input of the high frequency bridge 18 which is connected to the guide 21a. This mismatching causes a reflection of a small portion of the transmitted energy at this reflection point and this small reflected energy is delivered to the input of guide 21a of the high-frequency bridge 18 which is also connected to the high-frequency bridge 21. It may be assumed that in the present embodiment of the invention, the resistor 20 represents the mismatch. The oscillation reflected at the resistor 20 energizes the two detectors 23 and 24 in push-pull. The push-push input of the high frequency bridge 21 is connected to the guide 22, so that the two detectors 23 and 24 are energized in phase by the above-mentioned reflected portion of the transmitted oscillation. The coupling of the guide 22 to the output of the transmitter 16 is selected in such a manner, that the two portions of the high frequency bridge 21 have equal amplitudes. The length of the high-frequency guide 22 is proportional so that the two portions of the transmitted oscillation in the high frequency bridge 21 have a phase difference of about a quarter of a wave length of the transmitted oscillation, or an odd multiple thereof. In FIGURES 3b and 3c, the portion of the transmitted oscillation supplied to the detector 23 via the high frequency conductor 22 is indicated by the symbol $S_{12}$ (FIGURE 3b), said portion being in phase with the portion indicated by $S_{22}$ (FIGURE 3c) traveling also through the high frequency guide 22 to the detector 24. Because of the above-mentioned condition, the two portions of the transmitted oscillation appearing at the high frequency bridge 21 have a difference in phase of a quarter of a wave length, or an odd-numbered multiple thereof, the portion $S_{11}$ (FIGURE 3b) traveling to the detector 23 through the high frequency guide 17 and the high-frequency bridge 18 is shifted in phase by 90° in relation to vector $S_{12}$. The oscillation vector $S_{21}$ (FIGURE 3c) delivered to the detector 24 is phase-shifted by 180°, as compared with the vector $S_{11}$, because of the push-pull input. The portions of the transmitted oscillation are added at the detectors, resulting in oscillations indicated by $S_1$ and $S_2$ having a difference in phase of 90°. The Doppler oscillations obtained by mixing of $S_1 E_{23}$ and $S_2 E_{24}$, respectively, also have a phase difference of 90°.

The inputs of the two hybrid T's, as shown in the FIGURE 3a, may be exchanged. It is important only that in the high frequency bridge 18 one of its inputs connected to the transmitter output is decoupled from the one of its inputs connected to the second high frequency bridge 21. The connecting terminals of the second high frequency bridge 21, leading to the high frequency bridge 18, and to the guide 22, respectively, may be interchanged. However, the two detectors 23 and 24 have to be connected to those of the inputs which are energized by those of the connection circuits which are in similar phase relation and in push-pull, respectively. It is possible that phase relationships are present at the two detectors 23 and 24 other than those shown in FIGURES 3b and 3c, if the connections of the high-frequency bridges 21 and 18 are interchanged, as outlined above, but as long as the mentioned conditions are observed, the vectors $S_1$ and $S_2$ will be out of phase 90° as required. The hybrid T's, used as high frequency bridges according to FIGURE 3a, may be replaced by equivalent circuit elements, for example, by ring-hybrids or directional couplers, operating like a bridge damping in their passing direction by 3 db.

Another embodiment according to the invention is disclosed in FIGURE 4, using metalized tape-conductors on insulating boards. The tape, as shown in FIGURE 4, comprises a center conductor and two conductive surfaces covering all conductors in FIGURE 4. Ordinarily, such a circuit is built essentially of two insulating boards, having their outer surfaces completely metalized and carrying in their inner surfaces the center conductors. These boards are laid one upon the other, and electromagnetic fields are built up between the center conductor and the two outer conductive surfaces. The spacings between the center conductors in the plane of the insulating boards must be so large that the above-mentioned fields of one conductor cannot reach the other conductors in the vicinity. In FIGURE 4, numeral 25 denotes an insulating board upon which metalized conductive tapes are mounted, these segments being shown unhatched in the drawing. The conductive tapes, which are shown hatched in the drawing, are fixed upon the inner surface of the second insulating board, only partially shown in FIGURE 4. The connection terminal of the center conductors to the antenna is indicated by 26, and the connection terminal of the center conductors to the transmitter is indicated by 27. The conductors between these two terminals 26 and 27 and a first high-frequency bridge 28 are indicated by 29 and 30, respectively, which bridge 28 is designed as a ring hybrid. A terminating resistor 32 is connected to the third input of the high-frequency bridge 28 via a high-frequency path 31. This last-mentioned resistor comprises two plates of attenuating material, for example, graphite, contiguous to conductor 31. In order to avoid an abrupt mismatch, these two plates are tapered at the ends facing the high-frequency bridge 28. If the attenuation produced by the two plates 32 appears to be insufficient, wedge-shaped recesses may additionally be provided next to the resistance effective as outer conductors along the resistor plates or elements 32. The fourth input of the high-frequency bridge 28 is ordinarily completely decoupled from the high-frequency tape 30 when the matching is perfect. This fourth input is connected to a second high frequency bridge 34 via a conductor 33, said bridge also being a ring hybrid. The outputs symmetrical with respect to the conductor 33, are connected to two detectors 36 and 36'. The second portion of the transmitter oscillation which corresponds to the transmitter oscillation guided along conductor 22, according to FIGURE 3a, is supplied to the high-frequency bridge 34 via conductor 35. The portions of the transmitter oscillation supplied via the conductor 35 and the high frequency bridge 34 energizes the two detectors 36 and 36' in push-pull. Two control members are connected along the conductor 35. The first control member 37 is adapted to vary the coupling to the high-frequency conductor 30. The hatched conductor member 37 is metalized on a circular disk which is mounted rotatively on the second insulating board, not shown in the drawing. When turning the element 37, the coupling of conductor 35 to 30 is varied as well as the length of the conductor 35. This variation in length of conductor 35 may be compensated by a second member 38, controlling the phase. The element 38, formed similar to element 37, is also a circular disk, having the shown hatched metallic conductors and being rotatively mounted within the second insulating plate. The two control members 37 and 38 are provided only for an initial adjustment for compensation of manufacturing tolerances prior to putting the device into operation. The hatched conductive segments connected to the two detectors 36 and 36′ are also positioned on the second insulating board. The low-frequency output voltage is taken off at the ring-shaped ends 39 and 40 of the last-mentioned segments. The other ends of the segments, facing the high-frequency bridge 34, have no direct current connection to this bridge 34, but coupling is achieved by thin insulating plates mounted between the overlapping portions of the segments. These interruptions of D.C. conduction prevent a passing of low-frequency Doppler oscillation into the high frequency system. Two turnable taps 41 and 42 are positioned on the insulating plate 25 for adjusting the low-frequency outputs towards balance. The embodiment of the invention disclosed in FIGURE 4 operates in the same manner as the embodiment according to FIGURE 3a, hence, it seems unnecessary to describe the operation of the device of FIGURE 4 in detail.

The devices used for measuring speed, utilizing the Doppler effect as known in the art, have the disadvantage that undersired harmonics of the Doppler frequency appear during the mixing of the received oscillation with the transmitted oscillation. The common method of separating frequencies by means of filters ordinarily should not be employed in the field of Doppler frequency and its harmonics, because the Doppler frequency is variable over a larger frequency range, so that the Doppler frequency and its harmonics have overlapping ranges. In a speed measuring device according to the invention, the Doppler frequency can vary between 200 and 2000 cycle/sec., hence, the second harmonics will vary between 400 and 4000 cycles/sec.

It is an improvement of the present invention to provide a mixing circuit adapted for the exclusion of one of the harmonics of the Doppler frequencies.

An embodiment of such a mixing circuit will be more fully explained in the description of FIGURE 5, disclosing a device for the suppression of the third harmonics. The transmitter 43 of the measuring device supplies the antenna 44 through a high-frequency conductor 43a. Three directional couplers 45, 46 and 47 are positioned in the conductor 43a, each spaced by a quarter of the transmission-wave length. The receiving antenna 48 is connected to three detectors 49, 50 and 51, adapted for oscillation mixing. The conductor 50a to the diode 50 is curved in order to provide an equal path length for all the waves from the antenna 48 to each one of the mixing detectors; hence, the mixing detectors are energized in a corresponding phase relationship. Small portions of the transmission energy are coupled to diodes 49, 50 and 51 through the directional couplers 45, 46 and 47, respectively. Because of the λ/4 spacings between the directional couplers, the output oscillations of the mixing detectors 49, 50 and 51 are out of phase 90°, respectively. The filtering of the mixing frequencies occurs in selective amplifiers 52, 53 and 54. The amplifiers 52 and 54 are of the ordinary type, but the amplifier 53 has two output branches. The amplifier 53 may be replaced by two identical amplifiers in parallel connection. The third harmonic is extinguished by connecting the output terminals of the amplifier 52 to one of the output terminals of the amplifier 53, by means of a transformer 55 and, furthermore, by connecting the output terminals of amplifier 54 to the second output of amplifier 53 through a transformer 56. The two halves of the primaries of the transformers 56 and 57, respectively, are wound opposingly. The Doppler oscillations superimposed opposingly are mutually out of phase by 90° which, altogether, results in an oscillation having an amplitude of $\sqrt{2}$ times the amplitude of a single Doppler oscillation. The second harmonics are out of phase 180° at the two transformer inputs, and they cancel themselves because of the opposite winding of the two halves of the primary. The Doppler oscillations across the secondaries of the transformers 55 and 56 are out of phase 90°, yielding a suppression of signals reflected by approaching or receding objects. The suppression of the harmonics is independent of the frequency of the oscillation received, because the phase shift, necessary for cancelling the harmonics is applied to the constant transmitter frequency subsequently superimposed. By suitable selection of other degrees of phase shifts between the transmitted oscillations, supplied to the mixing detectors, and by selection of the resulting difference in phase between Doppler oscillations produced in said mixing detectors, harmonics other than the second one may be cancelled. However, the second harmonic has the least distance from the Doppler frequency and, furthermore, ordinarily, this second harmonic has an amplitude higher than the other harmonics. Therefore, it seems reasonable to provide a mixing circuit for cancelling the second harmonic.

Since the Doppler frequencies may vary over a wide range, depending upon the variations in velocity of the target object, the phase-shifting device according to the invention (12 in FIGURE 1a) for the second shift in phase should have a considerable frequency band width or must be independent of frequency, i.e., the shifting of the frequency by 90° has to be accurate at low as well as at high Doppler frequencies. The phase-shifting devices known in the art are hardly able to achieve such a requirement. Accordingly, a phase-shifting device is proposed adapted to be used for the present purpose with particular advantage. However, such a phase-shifting device may also be used in other kinds of circuits for which a constant shift in phase of an input variable over a large range of frequencies is desired, in which the phase shift may be constant or may be variable in a predetermined manner.

The phase-shifting device according to the invention employs means for phase shifting known in the art. On the input side, means are provided for converting the oscillation to be phase-shifted to a frequency having a relatively small band width; and at the output side, means are provided for converting the oscillation to its original frequency.

The frequency is converted in mixing circuits in which the frequencies to be phase-shifted are superimposed on an oscillation. Behind each of the mixing circuits, filters are provided through which the desired mixed frequencies may pass, but which exclude the undesired mixed frequencies. An example for such a phase-shifting device is illustrated in FIGURE 6. The oscillation to be phase-shifted, in this case the Doppler oscillation, i.e., a frequency range including the Doppler frequencies, is supplied to the input terminals of a mixing circuit 57; another input of the circuit 57 is connected to a generator 58 producing an oscillation of a frequency $f_1$. The mixed frequencies $f_1+f_D$ and $f_1-f_D$ appear across the output terminals of the mixing circuit 57. A high-pass filter 59 excludes the frequency $f_1-f_D$, so that only oscillations of the frequency $f_1+f_D$ may pass to the phase-shifting means 60. According to the desired use of the phase-shifting means, they may be constant or variable with respect to their phase-shift characteristic. For example, phase-shifting networks, pi-networks and/or T-elements, etc., may be used for this phase-shifting means. The oscillation phase shifted by the means 60 is supplied to a second mixing circuit 61 which is additionally supplied with the oscillation $f_1$ from the generator 58. The frequencies $2f_1+f_D$ and $f_D$ now appear across the output terminals of the circuit 61, but only the latter may pass through a low-pass filter 62.

In the circuit shown in FIGURE 6, the ratio of the frequencies $f_1$ and $f_D$ cannot be chosen too large, because the filter 59 may not be able to discriminate between the mixing frequencies $f_1+f_D$ and $f_1-f_D$ if they are too close. In order to use filters of moderate sharpness characteristic, it is advantageous to shift the oscillation employing two or more stages. FIGURE 7 shows such a circuit. Similar to FIGURE 6, the oscillation having the frequency $f_D$ is supplied to a mixing circuit 63, said mixing circuit obtaining an oscillation frequency $f_1$ from a generator 64. Again, across the output of the mixing circuit, the combination of frequencies $f_1+f_D$ and $f_1-f_D$ appears of which, by means of a high-pass filter 65, only the oscillation having the mixed frequency $f_1+f_D$ may pass. This last-mentioned frequency is supplied to a mixing circuit 67, said mixing circuit obtaining also an oscillation of the frequency $f_2$ produced by a generator 66. Combination frequencies $f_2+(f_1+f_D)$ and $f_2-(f_1+f_D)$ appear across the output of the mixing circuit 67. The first of these two oscillations may pass through a high pass filter 68 and is phase-shifted by proper phase-shifting means 69. A third mixing circuit 70 is connected to the output of the phase-shifting means 69, which circuit 70 is also supplied with an oscillation of the frequency $f_2+f_1$, said oscillation being in phase with the output of the circuit 70. The oscillation having the frequency $f_2+f_1$ is produced in a mixing circuit 71 supplied by the two generators 64 and 66 with oscillations of the frequencies $f_1$ and $f_2$, respectively. A high-pass filter 72 across the output of the mixing circuit 71 separates the oscillation having the frequency $f_1+f_2$ from the oscillation having the frequency $f_2-f_1$. A low-pass filter 73, connected to the output of the mixing circuit 70, passes the frequency $f_D$ and rejects the frequency $2(f_2+f_1)+f_D$.

The following example discloses constants for the frequencies $f_1$ and $f_2$, to be used in a circuit according to FIGURE 7, which was used in a radar reflector for measurement of speeds in accordance with FIGURE 1. The frequency $f_1$ was 20 kc. and the frequency $f_2$ was 1 mc.

Of course, the frequency conversion up to a higher frequency may be performed in three or more stages; however, in most instances, two stages, i.e., two mixing frequencies, are sufficient.

Somewhat different phase shifting devices for the second phase shift of one of the Doppler oscillations are disclosed in FIGURES 8 and 9, said phase-shifting devices being practically independent of the input frequency. These phase shifters may be used in place of element 12 in FIGURES 1a and 1b. The input of the phase shifter is supplied with one of the two Doppler oscillations having a phase of $\omega_D t \pm 90°$, depending upon an approaching or receding reflecting object. The Doppler oscillation is mixed in a mixer 74 with a heterodyne oscillation having the frequency $\omega_1$, produced in an oscillation generator 75. This heterodyne oscillation is phase-shifted by + or $-90°$ by means of a phase-shifter 76, so that the phase of the heterodyne oscillation is $\omega_1 t \pm 90°$ when it appears across the input of the mixing circuit 74. A filter 77 is connected to the output of the circuit 74, said filter passing only one of the mixed frequencies, for example, only the sum-frequency. The phase of this oscillation, as obtained by adjusting the phase-shifter 76 to a phase shift of $+90°$, appears at the output of the filter 77. If the Doppler oscillation supplied to the input of the phase shifter is advanced by 90°, as compared with the other Doppler oscillation, i.e., if the phase of said first-mentioned Doppler oscillation is $\omega_D t+90°$, the phase of the oscillation behind the filter 77, having the sum-frequency, amounts to $(\omega_1+\omega_D)t+180°$. However, if the two Doppler oscillations are different in phase, such as 90°, and one of the Doppler oscillations appearing across the input of the phase shifter has a phase of $\omega_D t-90°$, then the phase after filter 77 amounts to $(\omega_1+\omega_D)t+0°$. The phase, obtained after adjusting the phase shifter 76 to $-90°$, appears under the output conductor of filter 77. In this case, the phase of the sum-frequency amounts to $(\omega_1+\omega_D)+0°$, if the phase of the Doppler oscillation across the input of the phase shifter 76 is $\omega_D t+90°$. The phase of the Doppler oscillation having this sum frequency amounts to $(\omega_1+\omega_D)t-180°$, if the phase of the Doppler oscillation across the input of the phase shifter 76 is $\omega_D t-90°$. This sum frequency is now remixed with the Doppler frequency by means of a second mixing circuit 78, said circuit being additionally supplied with oscillatons from the oscillator 75. The phase of the last-mentioned oscillation amounts to zero; hence, a Doppler oscillation is produced by filtering the output of the mixing circuit 78 through a filter 79, the phase of said Doppler oscillation being $$\omega_D t+180°$$
$$+0°$$

by adjustment of the phase shifter 76 to $+90°$ and being $$\omega_D t+0°$$
$$-180°$$

by adjustment of the phase shifter 76 to $-90°$. Anyone skilled in the art will recognize that a phase shift completely independent of frequency may be achieved simply by phase-shifting of the heterodyne oscillation, which oscillation is constant, i.e., not variable, such as the Doppler frequency. By connecting the Doppler frequencies appearing across the output of the phase-shifting device to the second Doppler frequency, as is done, for example, in the transformer 14 according to FIGURE 1a, either one of the signals reflected from approaching or receding objects may be cancelled by adjusting the phase shifter 76 to $+90°$ or to $-90°$.

The device as shown in FIGURE 8 may be connected to both paths of the two Doppler oscillations. However, the heterodyne oscillations are phase-shifted by + and $-45°$, respectively, so that the difference in phase of the two Doppler oscillations amounts to 90° with respect to the inputs and outputs of the phase shifter. In such a circuit, a single generator is sufficient for the heterodyne oscillations.

The circuit described above may be further simplified, as will be explained as follows. As shown in FIGURE 9, several filters and one mixing circuit may be omitted. The two Doppler oscillations are supplied to two inputs of the phase shifter, respectively, which oscillations have a phase shift of $+90$ or $-90°$, depending upon whether the reflecting object approaches or recedes. The phase of the Doppler oscillation supplied to the lower input may be $\omega_D t$, which value may not be changed. The upper input receives an oscillation having the phase $\omega_D t \pm 90°$. The two Doppler oscillations are mixed with a heterodyne oscillation having the frequency $\omega_1$ within the mixing circuits 80 and 81, respetcively. The heterodyne oscillation is produced by generator 82. The output oscillations of the mixing circuits 80 and 81 are phase-shifted by the shifters 83 and 84 by $-45°$ and $+45°$, respectively. The phases of the oscillations having the sum frequency and appearing at the output of mixing circuits 80 and 81 appear above the output conductors. The phases of the oscillations having the difference frequency are shown below said conductors. The upper second member of the sum refers to oscillations at the output of the mixing circuit 81 if the phase of the Doppler oscillation at the input amounts to $\omega_D t+90°$; the lower member refers to said input phase for $\omega_D t-90°$. The mixed products of the circuits 80 and 81 are superimposed in a transformer 85. Said transformer may be adapted for a push-push or a push-pull superposition. In the present example, the superposition is push-pull in a push-pull transformer. By push-pull superposition, the sum frequency passes through the transformer if the phase of one of the Doppler oscillations amounts to $\omega_D t+90°$, the oscillation having the difference frequency cancelling out in the primary of the push-pull transformer. The reverse occurs if the phase of the oscillation across the input of the mixing circuit 81 amounts to $\omega_D t-90°$. In this event, only the difference frequency passes through the push-pull transformer and the sum frequencies cancel in the primary of the push-pull transformer. Consequently, the sum frequency appears at the output of the push-pull transformer 85 if the reflecting object travels in one direction and the difference frequency appears if the object travels in the opposite direction. A filter 86, adjusted to one of the frequencies $\omega_1 + \omega_D$ or $\omega_1 - \omega_D$, may pass the Doppler frequencies, reflected by approaching or by receding objects. The same result is obtained by selectively connecting filters into the circuit adjusted to the sum frequency and the difference frequency, respectively. The oscillations passed through filter 86 are supplied to a mixing circuit 87, to which also oscillations of the heterodyne frequency $\omega_1$ are applied. Across the output of mixing circuit 87 Doppler oscillations appear which are reflected only by approaching or by receding objects, depending upon the adjustment of the filter 86.

We claim:

1. A Doppler velocity measuring system for selectively discriminating between signals representing approaching and receding reflection targets, comprising a transmitter radiating a continuously transmitted frequency; a receiver providing a received frequency including the transmitted frequency reflected from a target and modified by the Doppler effect; phase-shifting means fed by said transmitter and supplying two quadrature components of said transmitted frequency; mixing means separately mixing said quadrature components with a portion of the received frequency and delivering the mixed frequencies in two separate channels; filter means selecting in each channel only the Doppler frequency product; a 90° phase shifter; means for selectively placing said 90° phase shifter in either one of said two channels for imposing a further 90° phase shift on the Doppler frequency product of the respective channel; superimposing means for superimposing upon each other the 90° phase-shifted Doppler frequency product of the particular channel incorporating said 90° phase shifter and the Doppler frequency product of the channel which does not incorporate said 90° phase shifter; and indicating means for measuring and indicating the output of said superimposing means depending upon its frequency, whereby said indicating means will respond either to signals reflected from approaching targets only or to signals reflected from receding targets only, depending on which of said two channel incorporates said 90° phase shifter.

2. In a system as set forth in claim 1, similar amplifier means having the same phase and amplitude characteristics in each of said two channels for amplifying said Doppler frequency product.

3. In a system as set forth in claim 1, switching means in said channels at said 90° phase shifter for selectively introducing the shift into one of the two channels whereby the direction of phase shift of one Doppler frequency product with respect to the other can be selectively reversed.

4. In a system as set forth in claim 1, said 90° phase-shifter being connected continuously in one of said channels, and control means for adjusting the phase shifter to furnish alternative shifts of +90° and −90°, whereby the direction of phase shift of one Doppler frequency product with respect to the other can be selectively reversed.

5. In a system as set forth in claim 1, said superimposing means comprising a transformer having two primary windings, each being connected to receive one of said Doppler frequency products, and said transformer having a secondary winding connected to said indicating means.

6. In a system as set forth in claim 1, said superimposing means comprising two electronic amplifier devices, each having an input electrode connected to receive one of said Doppler frequency products, and said devices each having an output electrode, said output electrodes being connected together and to said indicating means.

7. In a system as set forth in claim 1, an antenna connected for both transmission and reception; and said phase-shifting means and said mixing means including a first high frequency bridge having four terminals, one terminal being connected to said transmitter, and two terminals being connected respectively to said antenna and to a terminating resistance, the latter resistance being mismatched sufficiently that a small component of the transmitted frequency appears at the fourth terminal of the bridge; a second high-frequency bridge having four terminals, one of these terminals being connected to said fourth terminal of said first bridge to receive said small component of transmitted frequency, a second of these terminals being connected to said transmitter to receive therefrom a second component of transmitted frequency of an amplitude equal to said small component but 90° displaced in phase with respect thereto; and said mixing means being connected to the remaining two terminals of the second bridge and mixing said quadrature components of transmitted frequency with the received frequency appearing with same phase in both said first and second terminals of the second bridge.

8. In a system as set forth in claim 7, said bridges each comprising a hybrid T.

9. In a system as set forth in claim 7, said bridges each comprising a ring-hybrid.

10. In a system as set forth in claim 7, said bridges each comprising a directional coupler having an attenuation of 3 db in the pass direction.

11. In a system as set forth in claim 7, said connections and bridges comprising hollow wave guides.

12. In a system as set forth in claim 7, said phase-shifting means comprising a circuit mounted on an insulating board and including tape-like conductors of conductive material deposited thereon.

13. In a system as set forth in claim 7, said mixing means comprising mixing diodes.

14. In a system as set forth in claim 1, said phase-shifting means supplying three components of the transmitted frequency mutually related in phase by 0°, 90° and 180°; and said mixing means separately mixing each of these components with a portion of the received frequency; combining means for mixing the 90° mixed component with the 0° mixed component and separately mixing the 90° mixed component with the 180° mixed component, said combining means having separate outputs comprising said two channels wherein the second harmonic of the Doppler frequency products cancels out when the products are superimposed.

15. In a system as set forth in claim 1, said phase shifter comprising a frequency converter for converting the Doppler frequency products to a high frequency wherein the Doppler effect variations cover only a narrow-band width, means for shifting the phase of the converted frequency 90°, a second frequency converter for reconverting said shifted frequency to its original instantaneous values.

16. In a system as set forth in claim 15, said frequency converter comprising a mixing circuit followed by a high-pass filter, and said second frequency converter comprising a mixing circuit followed by a low-pass filter.

17. In a system as set forth in claim 14, said frequency converter comprising two stages of frequency-increasing means each followed by a high-pass filter of relatively broad band.

18. In a system as set forth in claim 1, said phase shifter comprising heterodyne oscillator means; means for phase-shifting the heterodyne oscillator frequency into two quadrature signals; mixing means for mixing one of said Doppler frequency products with one of said quadrature signals; and mixing means for reconverting the mixed output of said mixing means to the original Doppler frequency by mixing said output with the other quadrature signal.

19. In a system as set forth in claim 1, said phase shifter comprising heterodyne oscillator means; means for splitting and phase-shifting the heterodyne oscillator frequency into two quadrature signals; separate mixing means for mixing each one of said Doppler frequency products with a different one of said quadrature signals; and combining means for mixing the outputs of said separate mixing means with the oscillator frequency to regain the original Doppler frequency.

20. In a system as set forth in claim 19, said combining means comprising means for superimposing the outputs of said separate mixers; filter means connected with said superimposing means and being adjustable to select between the sum and the difference frequency produced by said separate mixing; and means for reconverting the selected frequency to the original Doppler frequency.

References Cited in the file of this patent

UNITED STATES PATENTS 2,540,076  Dicke _____ Feb. 6, 1951